Sept. 4, 1928.
E. C. THOMPSON
CAMERA
Filed June 10, 1925
1,682,813
2 Sheets-Sheet 1
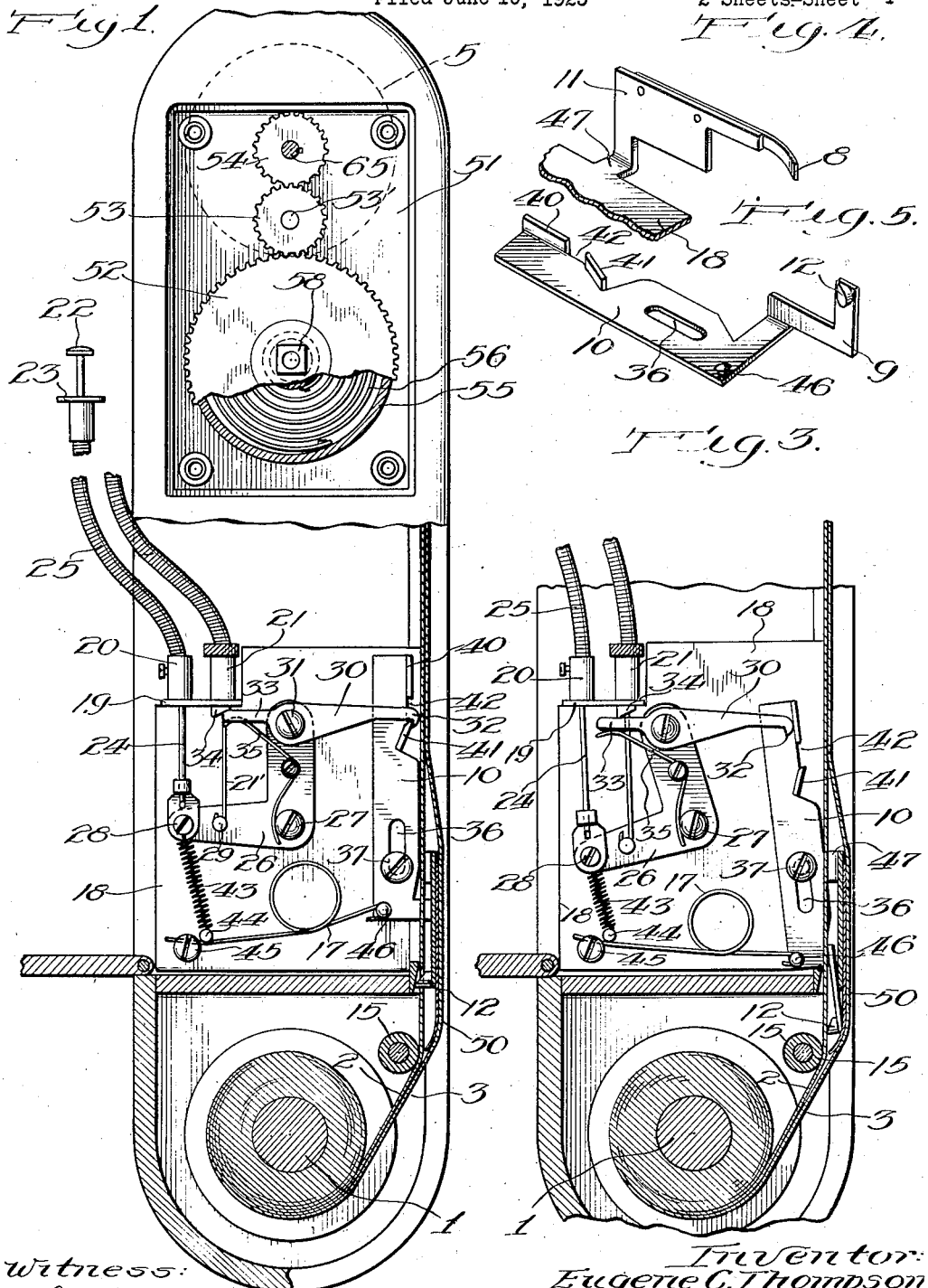
Witness: 
Inventor:
Eugene C. Thompson
by Frank L. Belknap
Atty.

Sept. 4, 1928. 1,682,813
E. C. THOMPSON
CAMERA
Filed June 10, 1925 2 Sheets-Sheet 2

Inventor
Eugene C. Thompson
by Frank L. Belknap
Atty

Patented Sept. 4, 1928.

1,682,813

UNITED STATES PATENT OFFICE.

EUGENE C. THOMPSON, OF LOS ANGELES, CALIFORNIA.

CAMERA.

Application filed June 10, 1925. Serial No. 36,070.

This application is in part an improvement on a co-pending application filed by me, Serial No. 753,074 filed December 1st, 1924.

More particularly, this invention is directed to two main features. One—means for separating the paper backing from the film it self in its travel through the camera, and secondly—the provision of novel means on the side of the camera on which the cable release for the shutter is positioned, for manually winding the film.

Briefly referring to the means for separating the paper backing from the film, a finger is provided normally adapted to contact the guide roll over which the film and paper pass, as they are unwound, said finger adapted to contact the back of the paper and be inserted in an aperture in said paper, causing separation between paper and film, and the subsequent travel from that point of the paper over the finger and its supporting structure, while the film passes underneath.

The particular novelty of the means for manually winding the film comprises a crank or handle connected with the film winding spool and positioned on the same side of the camera as is positioned the cable release for the shutter, said crank being detachably attached to said cable release, so that when the camera is in a position immediately subsequent to the taking of a picture, the film can be moved forward one exposure by simply imparting a rotary motion to the cable release which, through a connected detachable clamp imparts a rotary motion to the handle or crank.

I am aware that heretofore attempts have been made to provide means for engaging perforations in a film, no mention being made of perforations also in the paper backing strip with which roll films are provided. Experience has demonstrated that unless the paper and film are separated in some way no latch has so far been designed, and in my opinion, none can be designed which will engage a perforation in a film, for the reason that the paper and film move in very close proximity, and the imperforate paper prevents any latch from entering the film perforation.

Experience has further shown that it is impossible in practice to bring about an exact registration of apertures in paper and film, partly on account of the fact that the paper is always outside of the film, and hence at each revolution of the winding spool, the length of the paper wound will be slightly in excess of the film wound, amounting in six exposures to about one quarter of an inch. Also there is a different degree of expansion and contraction between paper and film under varying conditions of humidity, causing a further and very serious discrepancy in the registration of the apertures in paper and film. This difficulty appears to be entirely obviated by engaging perforations in the film alone, means for the accomplishment of this end being shown and described in this application.

Attention is specifically called to the bodily movable latch shown in this and co-pending application referred to. I have conducted an exhaustive series of experiments in the matter of stopping film by a latch, and have found that, without the cushioning action afforded by my novel form of latch, or its equivalent, the sudden and violent stopping of the film will almost invariably tear the film, and so cause the operation of the camera to fail. The two features above mentioned, while at first glance appearing trivial, are in fact extremely important, and I believe these two features serve to make commercially practicable, a type of camera which to this date, has been rejected by all manufacturers as entirely impractical.

Referring to the drawings, Fig. 1 is a view partly in vertical section, and partly in side elevation of a roll film camera equipped with my invention, showing the latch mechanism in one position.

Fig. 3 is a view similar to Fig. 1 showing the latch mechanism immediately after a picture has been taken.

Fig. 4 is a perspective view of the finger and support therefor, for separating the paper backing from the film.

Fig. 5 is a perspective view of my novel form of latch.

Figure 2:
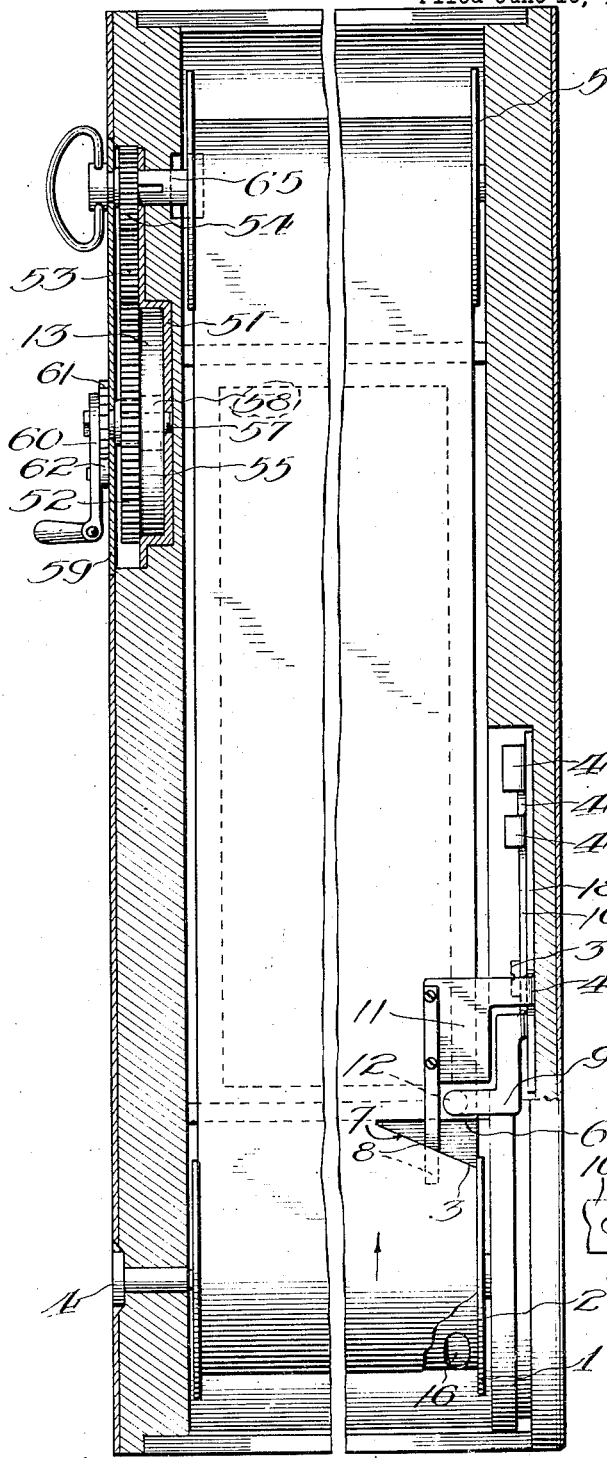
Fig. 2 is a side view partly in section showing the motor mechanism for automatic winding.
Figure 6:
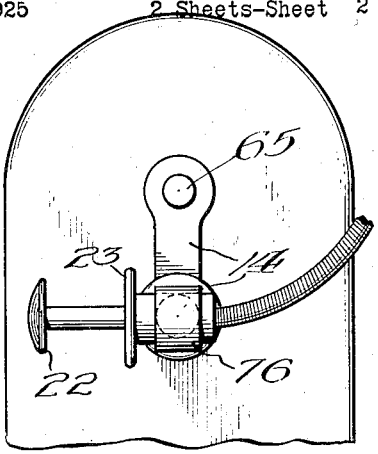
Fig. 6 is an enlarged side elevational view illustrating a connection between the cable release and winding crank which I may employ in lieu of the handle shown in Fig. 1.

Referring more particularly to the drawings, the camera at one end receives a film delivery spool 1 on which is wound the film 2 and paper backing 3 as is usual in all roll film types of cameras. This film spool is adapted to be held in place by means of the laterally movable key 4. The end of the paper backing is adapted to be placed on the receiving spool 5. Before the film and paper backing are wound on the delivery spool 1, the paper backing is slit inwardly at right angles to one edge as shown at 6, and a free end of said slit portion is folded along the triangular line 7 underneath the paper backing so that it is interposed between the paper backing and the film itself.

In its travel from the delivery spool 1 to the receiving spool 5, the notched portion engages the finger 8. The end of the paper from the delivery spool is first passed under the extended angle portion 9 of the latch 10 and under the finger 8 and its supporting structure 11 and attached to the receiving spool in the usual manner, the projection 12 of the extended end 9 of the latch 10 riding on the back of the paper strip. The paper is then moved forward and wound on the delivery spool, either by means of the motor mechanism designated as a whole 13, or the manually rotated crank or handle 14 connected with the receiving spool. When the notch 6 in the paper passes over the guide roll 15, the end of the finger 8 pressing lightly on the paper, passes under the flap previously described, and then rides on the back of the film 2 and under the paper backing 3, the film continuing to move forward underneath the end of the latch 10 and the finger 8 and its support, while the paper goes over the back of the same structures. The paper and film are then moved forward until the first of a series of perforations 16 disposed in the film along one edge thereof corresponding to the number of exposures to be taken on the film, registers with the latch-lug 12, which is depressed by the pull of the spring 17, which performs the function of a double acting spring and comprises a single strand of wire, provided with a loop or coil intermediate its ends.

The latch mechanism will now be described. In Fig. 1 is shown a bed plate 18 attached to the inside of the camera wall. This plate is notched and a short projection 19 is bent upward at right angles thereto. This projection is perforated for receiving the cable releases 20 and 21. Cable 20 is of standard construction and is of the "pull" type, in which pressure of the thumb on the button 22 and pulling of the finger on the flange 23 pulls the wire 24 a short distance into the sheath 25. Cable release 21 is of the standard construction furnished with nearly all hand cameras, one end being attached to the lens shutter and the opposite end being screwed into the plate 19. A bell crank 26 is pivoted to the bed plate by means of the screw 27. One end of this bell crank receives the wire of the release 20 at 28. It also receives the wire of the release 21 at 29. To the opposite end of the bell crank is pivoted a dog 30 by means of the screw 31, this dog being provided at one end with a hook-like projection 32, the opposite end being extended in a tail-like projection 33. A small sloping projection is provided on the plate 19 at 34. A small wire spring 35 tends to hold the tail-like projection of the dog 30 in contact with the plate 19.

The latch 10 is provided with an internal slot 36 through which the shoulder screw 37 is screwed into the bed plate 18. One end of this latch is bent upwardly at right angles to provide the extension 9, from face of which extension 9 projects the lug 12.

The opposite end of this latch is provided with two projections 40 and 41 bent at right angles to the surface thereof. Between these two projections is a space 42. A coil spring 43 is attached at one end to the screw 28 and at the other to the retaining pin 44. A single loop wire spring 17 is positioned under the head of the screw 45 at one end, the other end being hooked onto a pin 46 in the end of the latch 10.

At one side of the bed plate 18 is a projection 47 (Fig. 4) bent intermediate its length at right angles connected to the supporting structure 11.

Describing now the spring motor mechanism used when automatically winding the film, a bed plate 51 is placed in a recess in the camera wall, and carries the gears 52, 53 and 54 mounted on arbor 58 and shafts 53' and 54'. Gear 52 has mounted on one side a spring barrel 55 for the reception of a ribbon spring 56 spirally disposed therein. A stud 57 (Fig. 2) is screwed into the bed plate 51. On this stud is mounted the arbor 58 (see Fig. 2). This arbor is adapted to revolve on the stud 57, and one end passes through the cover plate 59 (Fig. 2), and to it may be attached the winding crank 60. A ratchet 61 is attached to the cover plate 59, a pawl 62 being provided adapted to engage the teeth of the ratchet 61. The ribbon spring is attached in the usual manner to the spring barrel at its outer end, the inner end of the spring being provided with a small slot which fits over a small projection on the arbor 58, the details of this construction not being particularly shown, being well known to those skilled in the art. Gear 54 is slidably keyed to the shaft 54', this latter being provided at its inner end with a wing for engaging a slot in the end of the receiving spool and at its outer end with a foldable handle, the construction of which being well known in the art, will not be particularly described.

Under certain circumstances, it may be advisable to use in connection with the latch, a friction clamp adapted to engage the film and prevent tearing the ends of the perforations in the films. In practice, this has not been found necessary, but I desire to disclose this device, as it may be desirable to use same. This device is shown diagrammatically in Fig. 8. A support 66 which may be attached to the camera wall, is shown extending upwardly and bent at right angles to provide a support 67. In practice the form of this support might be changed, according to its location, or its place taken by the end of the bellow-supporting plate. The arm 68 is pivoted preferably to the camera wall by the pin 69. This pin also supports an eccentric projection shown in exaggrated form at 70. The opposite end of the arm 68 is provided with a screw 71 for the reception of a link 72, which link is adapted to be attached at the other end by means of the pin 46 to the end of the latch 10, the supporting plate 66 and the eccentrically mounted projection 70 being so disposed as to allow the edge of the film to pass between them as shown in Fig. 8.

Figure 7:
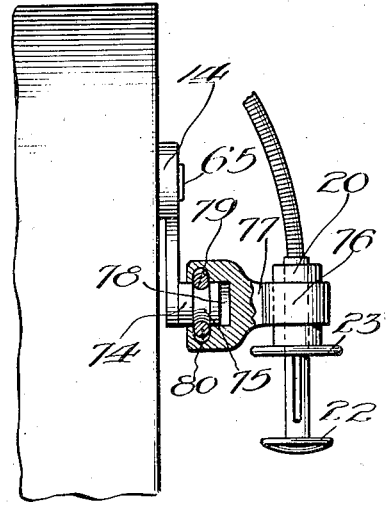
Fig. 7 is a front view, partly in section, of the view shown in Fig. 6.

I will now describe the clip for making connection between the crank and cable release 20, for manual operation. Fig. 7 shows a crank 14 which is attached to a shaft such as 65, which, being of standard construction will not be specifically described. The outer end of this crank is provided with a button 74 and an annular groove 75. Around the flange 23 is fitted a collar 76, forming one end of the clip 77. The end of this clip toward the camera is recessed as shown at 78, this recess being provided with the annular groove 79, in which may be placed a spring ring 80. To make use of this device, the camera is opened, the lens support moved forward, and the grooved recess of the clamp 77 slipped over the button 74, being held in place by the spring ring 80. A pressure of the thumb on 22 operates the shutter in the usual manner, the flange 23 being held between the first and second fingers of the right hand, the camera being supported by the left hand.

After the button 22 has been pressed by the thumb and released, being returned to normal position by a spring, (not shown) the end of the release held as described above, is given a circular motion, which, by means of the connected clip 77, imparts rotary motion to the handle 14, and the film wound on the receiving spool until stopped by the latch-lug 12' dropping into one of the perforations disposed in the film, when the operation may be quickly and easily repeated without changing the position of either hand.

Figure 8:
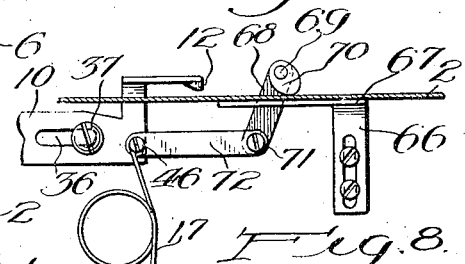
Fig. 8 is a detailed view illustrating brake mechanism adapted to contact the film in its travel.

Though the clamp mechanism diagrammatically shown in Fig. 8 is not normally used in the camera as built and operated by applicant, its operation will be described. One end of the latch 10 having been depressed, as already described in the operation of the latch mechanism, and the latch-lug 12 having been thus disengaged from an aperture in the film, the latch moves bodily backward to the extent allowed by the slot 36. The eccentric 70 is shown in pressure contact with the film. As the latch 10 moves forward, it moves the arm 68 by means of the link 72. As the end of arm 68 is drawn backward, it of course raises that part of the eccentrically mounted projection in contact with the film, and releases the pressure on the film, which is then free to move forward without friction from this source. When the lug 12 falls into another perforation in the advancing film, the latch is carried with it to the extent of the slot 36, which, through the medium of the link 72 moves the arm 68, and again tends to clamp the film between the lug 70 and the plate 67, thereby assisting in stopping the film and tending to obviate tearing of the end of the perforation, which might under some circumstances occur, but in actual practice, very seldom does occur.

In case it is desired to operate by the automatic method, that is, by means of the spring winding mechanism, the film having been placed in the camera as described, and the end of the paper inserted in the receiving spool 5, the crank 60 is turned, rotating gears 52, 53 and 54, the last gear rotating the winding spool. There being practically no resistance offered by the film until the latch lug has engaged the first perforation, the spring does not begin to wind until the film is in position for the first exposure. The spring is then wound by the handle 60, being prevented from unwinding by the ratchet 61 and its pawl 62. Pressure of the thumb on the button 22 of the cable release 20 pulls the end of the bell-crank 28 forward, releasing the shutter in the usual manner. As this is done, the opposite end of the bell-crank 28 is raised, carrying with it the dog 30, until its hook-like end 32 projects through space 42, and forced by the wire spring 35, acting on the tail 33, engages the projection 41. The pressure of the thumb on button 22 is then released, and the end of the bell-crank 28 retracted partly by the coil-spring 43, and partly by a spring in the standard cable release 21, not shown. As the bell-crank 28 returns to its normal position, the end of the latch 10 is drawn downward to the angle shown in Fig. 3. The latch-lug 12 is disengaged from the perforation in the film, and forced by the spring 17, acting against the fulcrum 44 moves bodily backward to the extent allowed by the slot 36, thus preventing the lug 12 from falling back into the same perforation.

When the latch has been disengaged from a perforation and has moved rearwardly in the manner just described, the notch 42 is no longer directly over the hooked end 32, but the projection 40 is directly over the end of the dog, as shown in Fig. 4. It will of course, follow that the dog 30 cannot be raised from its normal position, and the bell-crank thus cannot be moved forward at its lower end; consequently, the shutter cannot be actuated until lug 12 in latch 10 has engaged the next perforation in forwardly moving film, and been returned to the position shown in Fig. 1.

Subsequent to making the last exposure, and the simultaneous raising of the latch, there being no further perforations in the film, the film and its paper protecting strip will be completely wound on the winding spool.

From the foregoing description, it will be seen that I have a camera film roll composed of the backing of paper supporting the film proper. In this invention the film is perforated, but the backing is imperforate. As far as I am aware, I am the first inventor of a camera roll film in which the film itself is perforated but the backing is not. I shall claim this matter in a separate application.

I claim as my invention:

1. In a roll film camera adapted to receive a film perforated at intervals and a paper backing therefor imperforate except for a slit at a point near and over the initial end of the film, the combination with a latch having a projection adapted to engage the perforations in the film, means for controlling the engagement and disengagement of said latch projection, means for separating said film and paper backing, means for causing said latch projection to pass intermediate said film and paper backing so as to permit said latch to engage perforations in the film only.

2. In a roll film camera adapted to receive a film perforated at intervals and a backing therefor apertured intermediate its length, the combination with delivery and receiving spools, of a movable latch adapted to engage the perforations in the film and slide forwardly with said film for a relatively short distance, means for controlling the engagement and disengagement of the latch, and means for separating the film from the backing positioned in advance of said latch whereby the latch passes intermediate said film and backing paper so that it may only engage perforations in the film.

3. In a roll film camera adapted to receive a film perforated at intervals and a backing therefor apertured intermediate its length, the combination with delivery and receiving spools, of a movable latch adapted to engage the perforations in the film and slide forwardly with said film for a relatively short distance, means for controlling the engagement of the latch, means for separating the film from the backing in their forward travel, comprising a finger positioned in advance of said latch adapted to enter said aperture in the backing to cause the backing to travel over the finger and latch while the film travels under the finger and latch, whereby the latch may only engage perforations in the film.

EUGENE C. THOMPSON.